Patented Jan. 30, 1940

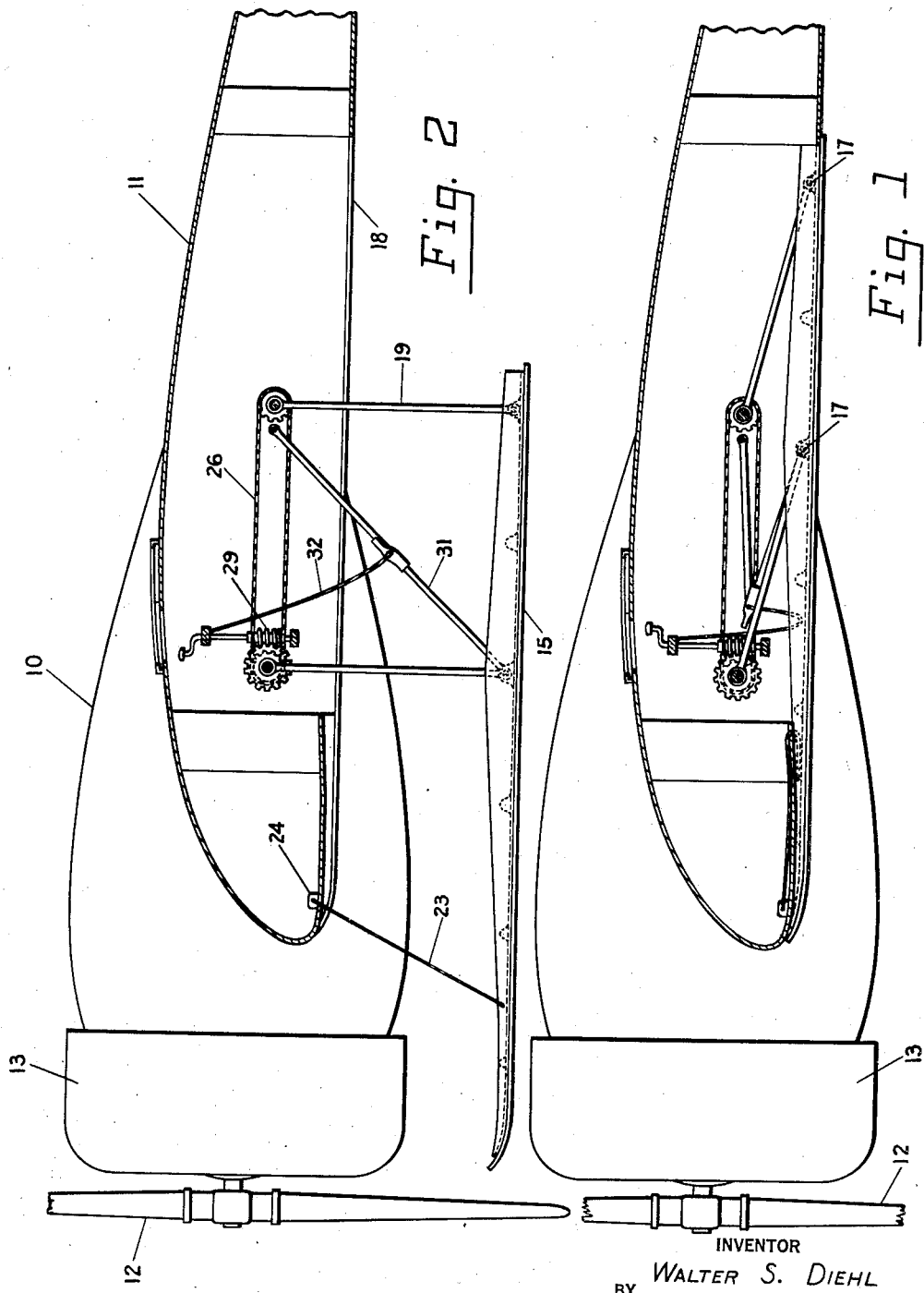

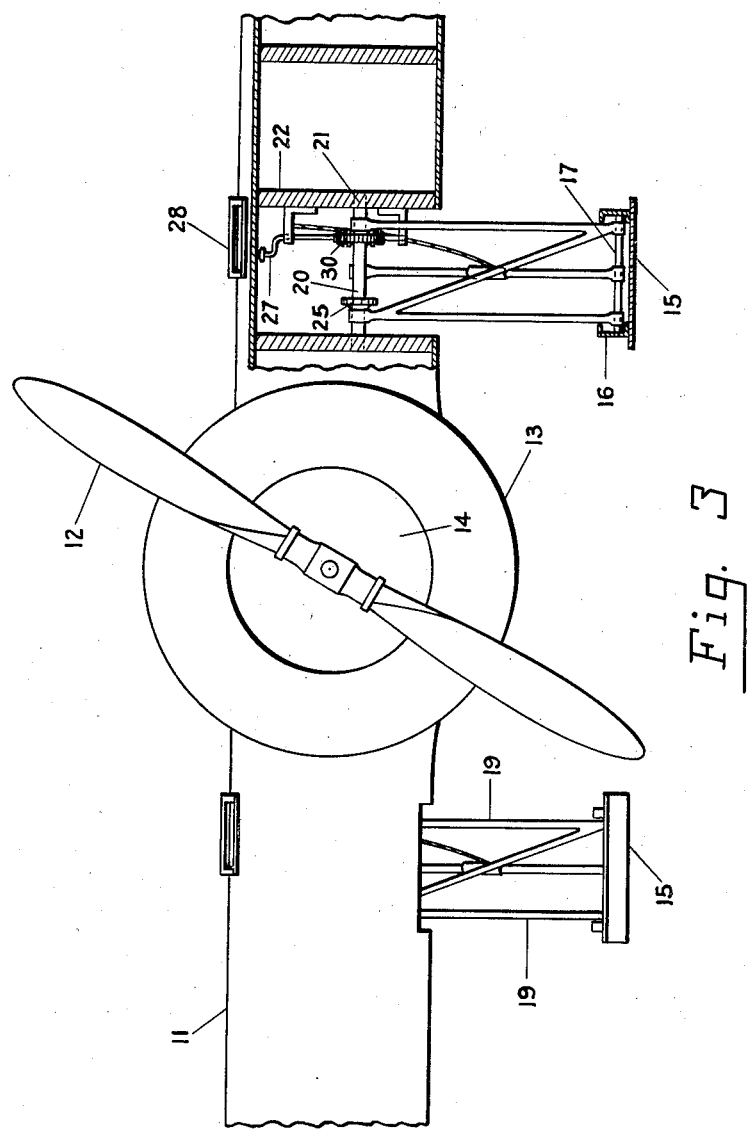

2,188,338

UNITED STATES PATENT OFFICE 2,188,338

FOLDING PLATFORM FOR SERVICING AIRPLANE ENGINES

Walter S. Diehl, United States Navy

Application December 21, 1937, Serial No. 180,991

5 Claims. (Cl. 244—129)

(Granted under the act of March 3, 1883, as amended April 30, 1928; 370 O. G. 757)

This invention relates to a folding platform for servicing airplane engines, and has for an object to provide a platform normally streamlined into the wing of an airplane, but quickly adjustable for use at any time.

In large size airplanes the use of an efficient nacelle with the engine forward of the wing leading edge has the objection that it is difficult to service the engine. While in repair shops or on landing fields it is possible to provide temporary platforms for access to the engine or engines of large airplanes, such becomes virtually impossible in the case of large seaplanes, and it is often necessary to bring the seaplane on land before the motor can be properly serviced. The time element in bringing the seaplane ashore and then afterward restoring it to the surface of the water is often substantially greater than the time element in actually servicing the engine. Furthermore, a platform or scaffolding large enough for use in servicing one type of airplane or seaplane may not be large enough for servicing another type of equally large, or even larger, airplane or seaplane.

It is an object of this invention to provide a folding platform or runway which may be built as an integral part of the under surface of the wing, being countersunk therein and forming part of the streamlined surface therein when not in use, yet capable of being quickly placed in operative position at any time whether ashore or afloat, and, in extreme emergency, capable of use even while in flight.

With the foregoing and other objects in view, the invention consists in the construction, combination and arrangement of parts hereinafter described and illustrated in the drawings, in which:

Figure 1 is a sectional view through an airplane wing showing the platform in retracted position;

Fig. 2 is a view similar to Fig. 1, with the runway or platform in operative position; and Fig. 3 is a fragmentary front elevation of an airplane partly in section, showing the runways or platforms in operative position.

There is shown at 10 the nacelle of a large airplane or seaplane extending forwardly from the wing 11 in the conventional manner, the nacelle having the usual engine 14 at the forward end thereof operating the propeller 12, the engine 14 being located within the cowling 13.

The platform or runway 15 constituting the essence of this invention may be of suitable light-weight material, such as structural aluminum reinforced by structural channel beams 16. A pair of supporting bars 17 are secured to the channel beams 16 adjacent the center and rear of the platform or runway 15. The runway or platform 15 is shaped to conform to the bottom surface of the wing 11, which is provided with a suitably shaped opening 18 into which the channel beams 16 may be retracted, holding the bottom of the platform or runway 15 in conformity with the remainder of the bottom surface of the wing 11.

Pivoted to the supporting bars 17 are a pair of supporting stanchions 19 which may be suitably braced, their other ends being keyed on shafts 20 which are journalled as at 21 within the struts 22. The forward end of the platform or runway 15 may have a flexible or foldable member 23 secured thereto and to a suitable bracket 24 within the forward end of the opening 18.

Any suitable arrangement may be made for retracting the platform or runway 15 into the closed position shown in Fig. 1. If intended solely for use while on the ground or in the water, the arrangements illustrated will be serviceable and consist of sprocket members 25 keyed to each shaft 20, and connected by a sprocket chain 26, so as to insure both shafts rotating in unison.

A crank arm 27 available through a handhole or trap door 28 in the top of the wing operates a worm gear 29 and a gear 30 keyed to one of the shafts 20 for raising or lowering the stanchions 19 and the platform or runway 15.

A foldable brace 31 having a flexible member 32 for breaking it to permit it to be raised may be provided for holding the platform or runway steady. Obviously, the crank arm 27 instead of being accessible through the handhole or trap door 28 may be remotely controlled from the fuselage, either mechanically or pneumatically, in the same way that retractible landing wheels are raised or lowered by remote control, thus eliminating the necessity for the trap door 28. Likewise, foldable guard rails may be provided on the runway or platform 15, enabling the platform or runway 15 to be used in flight, when necessary in an emergency.

Other modifications and changes in the proportions and arrangements of the parts may be made by those skilled in the art without departing from the nature of the invention within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. In an airplane wing having an engine nacelle projecting forwardly thereof, an engine servicing mechanic's platform or runway streamlined into the lower surface of the airplane wing, and means operable from the cockpit for extending said platform or runway downwardly and forwardly from said wing and including rigid means for supporting it in extended forward position adjacent the engine nacelle while in flight.

2. In an airplane wing having an engine nacelle projecting forwardly thereof, an engine servicing mechanic's platform or runway streamlined into the lower surface of the airplane wing, and supporting means operable from the cockpit for extending and retracting said runway or platform to operative position adjacent the nacelle during flight and to recessed position streamlined in the lower wing surface adjacent the engine nacelle, said supporting means comprising a pair of parallel rigid stanchions, one end of each stanchion being pivoted to said platform, a pair of shafts on said airplane wing, the other ends of said stanchions being keyed on said shafts, and means for operating said shafts in synchronism.

3. The combination of an airplane wing, an engine nacelle forward thereof, an engine servicing mechanic's folding platform normally counter-sunk in the wing surface, and means for extending and retracting said platform to and from a position alongside said nacelle while in flight, said means including a pair of parallel rigid stanchions, one end of each stanchion being pivoted to said platform, a pair of parallel shafts in said airplane wing, the other ends of said stanchions being keyed to one of said shafts, means operable from the cockpit for rotating said shafts in synchronism, and foldable brace means connecting said platform and said airplane wing for holding said platform braced in extended position.

4. An engine servicing mechanic's extensible platform normally countersunk in an airplane wing surface, and means for extending and retracting said platform said means being operable from the cockpit and including rigid stanchions pivoted at one end to said platform and at their other end to the airplane wing.

5. An engine servicing mechanic's folding or extensible platform normally countersunk in an airplane wing surface adjacent an engine nacelle, and means for extending and retracting said platform, said means being operable through the wing while in flight, said means including a pair of parallel rigid stanchions, one end of each stanchion being pivoted to said platform, a pair of parallel shafts in said airplane wing, the other ends of said stanchions being keyed to one of said shafts, means operable from the cockpit for rotating said shafts in synchronism, foldable brace means connecting said platform and said airplane wing for holding said platform braced in extended position, and flexible means connecting the forward end of said platform to the leading edge of said airplane wing for reinforcing the forward end of said platform.

WALTER S. DIEHL.